US012648669B2

(12) United States Patent
Dong et al.

(10) Patent No.: US 12,648,669 B2
(45) Date of Patent: Jun. 9, 2026

(54) UNCOATED NON-STICK PAN

(71) Applicant: ZHEJIANG SUNTRUE HOUSEWARE TECH CO., LTD, Jinhua (CN)

(72) Inventors: Xuelu Dong, Jinhua (CN); Xucai Tu, Jinhua (CN)

(73) Assignee: ZHEJIANG SUNTRUE HOUSEWARE TECH CO., LTD., Jinhua (CN)

( * ) Notice: Subject to any disclaimer, the term of this patent is extended or adjusted under 35 U.S.C. 154(b) by 0 days.

(21) Appl. No.: 19/389,166

(22) Filed: Nov. 14, 2025

(65) Prior Publication Data

US 2026/0130540 A1 May 14, 2026

Related U.S. Application Data

(63) Continuation of application No. PCT/CN2025/130148, filed on Oct. 27, 2025.

(30) Foreign Application Priority Data

Nov. 14, 2024 (CN) .......................... 202422783085.7

(51) Int. Cl.
A47J 36/02 (2006.01)
A47J 27/00 (2006.01)

(52) U.S. Cl.
CPC ........... *A47J 36/025* (2013.01); *A47J 27/002* (2013.01)

(58) Field of Classification Search
CPC ........ A47J 36/025; A47J 27/002; A47J 37/10; A47J 36/02; A47J 27/00
See application file for complete search history.

(56) References Cited

U.S. PATENT DOCUMENTS

2011/0192850 A1* 8/2011 Le Bris ................. A47J 36/025
220/573.2

FOREIGN PATENT DOCUMENTS

| | | | | |
|---|---|---|---|---|
| CN | 110760779 A | 2/2020 | | |
| CN | 212996000 U | 4/2021 | | |
| CN | 220735156 U | 4/2024 | | |
| CN | 118749814 A | 10/2024 | | |
| CN | 223335937 U | 9/2025 | | |
| DE | 202021104451 U1 | 8/2021 | | |
| DE | 202022106642 U1 * | 12/2022 | .............. | A47J 37/10 |
| DK | 156372 B * | 8/1989 | .............. | A47J 36/02 |
| EP | 0928588 A1 * | 7/1999 | ........... | A47J 27/022 |
| FR | 2935246 A1 * | 3/2010 | .............. | A47J 36/02 |
| FR | 2962937 A1 * | 1/2012 | .......... | C09D 183/04 |
| TW | M483759 U * | 8/2014 | | |

* cited by examiner

*Primary Examiner* — Shawn M Braden
(74) *Attorney, Agent, or Firm* — Bayramoglu Law Offices LLC

(57) ABSTRACT

An uncoated non-stick pan includes a pan body with a non-stick area formed on the inner surface of the pan body, wherein the non-stick area includes several interconnected concave-convex units, each of which includes several first convex ribs and a concave part enclosed by several first convex ribs, the concave part includes a concave bottom surface and a concave side surface, the concave bottom surface is opposite to the first convex ribs and connected thereto through the concave side surface, and the angle between the concave side surface and the concave bottom surface is greater than 90°.

12 Claims, 3 Drawing Sheets

UNCOATED NON-STICK PAN

CROSS REFERENCE TO THE RELATED APPLICATIONS

This application is a continuation application of International Application No. PCT/CN2025/130148, filed on Oct. 27, 2025, which is based upon and claims priority to Chinese Patent Application No. 202422783085.7, filed on Nov. 14, 2024, the entire contents of which are incorporated herein by reference.

TECHNICAL FIELD

The present disclosure relates to the technical field of uncoated non-stick cookware, and in particular to an uncoated non-stick pan.

BACKGROUND

Uncoated non-stick pans are increasingly widely used in daily life due to their safer and healthier use effects compared with coated non-stick pans.

In the prior art, oil storage microholes are provided at the bottom of the pan body to reduce the contact area between food and the pan bottom, thereby creating a physical non-stick barrier to achieve a non-stick property without the need for chemical non-stick coatings.

However, in the practical use of the non-stick pan with oil storage microholes in the related art, the microholes are prone to clogging, which affects the non-stick effect and service life of the non-stick pan.

SUMMARY

The technical solution disclosed in the present disclosure aims to solve one of the technical problems in the related art to a certain extent. Therefore, the present disclosure provides an uncoated non-stick pan which offers superior physical non-stick properties.

To achieve the above purpose, the first aspect of the present disclosure discloses an uncoated non-stick pan, including a pan body with a non-stick area formed on the inner surface of the pan body. The non-stick area includes multiple of interconnected concave-convex units, each of which includes multiple of first convex ribs and a concave part enclosed by multiple of the first convex ribs. The concave part includes a concave bottom surface and a concave side surface, the concave bottom surface is opposite to the first convex ribs and connected thereto through the concave side surface, and the included angle between the concave side surface and the concave bottom surface is greater than 90°.

Compared to the structure of oil storage microholes of uncoated non-stick cookware in the prior art, the concave-convex units provided in the present application is smaller in size, reducing the possibility of food entering the concave-convex units. Additionally, the first convex ribs and the concave bottom surface are connected through the concave side surface, and the included angle between the concave side surface and the concave bottom surface is greater than 90°, so the concave side surface forms an inclined structure, which may reduce the possibility of clogging compared with the structure of oil storage microholes with a straight wall structure in the prior art. Moreover, the size of the first convex ribs are specified in the present technical solution. Compared with the structure of oil storage microholes in the prior art, each concave-convex unit has a smaller size, and in each concave-convex unit, the first convex ribs are nearly linear in shape, which may minimize the contact area with food and improve the non-stick effect of the pan.

Furthermore, the concave bottom surface is rectangular in shape, and the first convex ribs are provided in one-to-one correspondence with the sides of the concave bottom surface. Furthermore, the aperture dimension of the concave part ranges from 0.2 mm to 0.8 mm.

Furthermore, the included angle between the concave side surface and the concave bottom surface ranges from 120° to 180°, resulting in a steeper inclination of the concave side surface. This design effectively prevents food particles from clogging the concave-convex units and facilitates easier cleaning.

Furthermore, the combined area of all first convex ribs within the non-stick area accounts for 5% to 10% of the total area of the non-stick area, which reduces the area ratio of the first convex ribs in the non-stick area, further reduces the contact area with food, and improves the non-stick performance.

Furthermore, the width of the first convex rib ranges from 0.1 mm to 0.3 mm. Furthermore, the height difference between the first convex rib and the concave bottom surface ranges from 0.1 mm to 0.3 mm.

Furthermore, the inner surface of the pan body further includes a first area located at the edge of the pan body, and an annular transition area positioned between the first area and the non-stick area.

Furthermore, the surface of the non-stick area is subjected to nitriding treatment to form a nitrided layer, and the surface of the first area is subjected to oxidation treatment to form an oxidized layer. This dual treatment design enhances the hardness and wear resistance of the non-stick area, thereby extending the service life of its non-stickiness properties.

Furthermore, two adjacent concave-convex units are interconnected through one of the first convex ribs. With the top surfaces of the concave-convex units only connected through the first convex ribs, the contact area with food may be minimized.

Furthermore, the concave bottom surface is configured as a rectangular, with each convex rib positioned in one-to-one correspondence to a respective side of the concave bottom surface, and each first convex rib connected to the corresponding side of the concave bottom surface through the concave side surface.

Furthermore, the concave-convex units are formed by embossing.

Furthermore, the base material of the pan body includes a titanium metal layer and an aluminum metal layer, wherein the titanium metal layer constitutes the inner surface of the pan body and forms the non-stick area.

Furthermore, the base material of the pan body including a titanium metal layer, an aluminum metal layer and a steel metal layer, with the aluminum metal layer interposed between the titanium metal layer and the steel metal layer, and the titanium metal layer constituting the inner surface of the pan body and forming the non-stick area.

These features and advantages of the present disclosure will be disclosed in detail in the following specific embodiments and accompanying drawings. The best implementation modes or means of the present disclosure will be elaborated in combination with the accompanying drawings, but they are not intended to limit the technical solution of the present disclosure. In addition, these features, elements and components appearing in each subsequent text and accompanying drawing are multiple in number, and are marked with different symbols or numbers for convenience of expression, but all represent parts with the same or similar structures or functions.

BRIEF DESCRIPTION OF THE DRAWINGS

The present disclosure will be further described below with reference to the accompanying drawings.

REFERENCE NUMERALS

Figure 1:
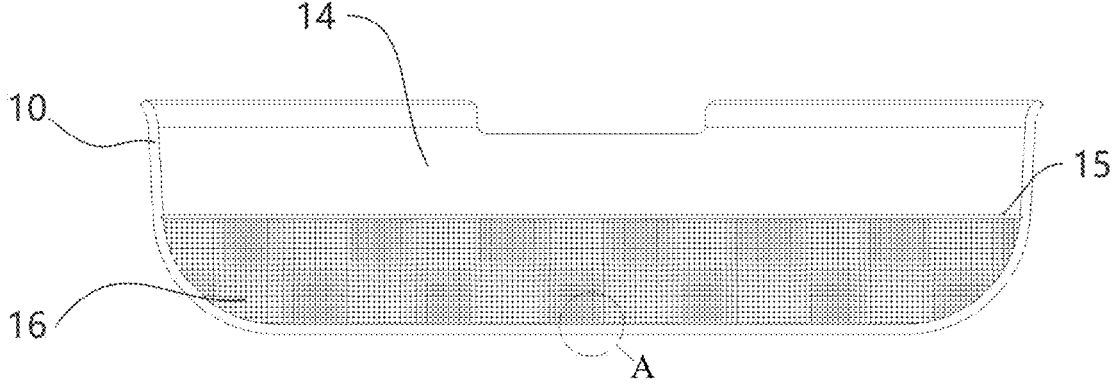
FIG. 1 is an overall structural view of one embodiment of the present disclosure.

10. pan body; 11. titanium metal layer; 12. aluminum metal layer; 13. steel metal layer; 14. first area; 15. transition area; 16. non-stick area; 20. concave-convex unit; 21. first convex rib; 22. concave bottom surface; 23. concave side surface.

DETAILED DESCRIPTION OF THE EMBODIMENTS

The embodiments of the present disclosure are described below in detail. Examples of the embodiments are shown in the drawings. The same or similar numerals represent the same or similar elements or elements having the same or similar functions throughout the present disclosure. The embodiments in implementations are only used to explain the present disclosure, and should not be construed as a limitation to the present disclosure.

The term "one embodiment" or "embodiment" or "example" referred to in the description means that a specific feature, structure or characteristic described in connection with the embodiment can be included in at least one embodiment of the present disclosure. The phrase "in an embodiment" in the description unnecessarily refers to the same embodiment.

Figure 2:
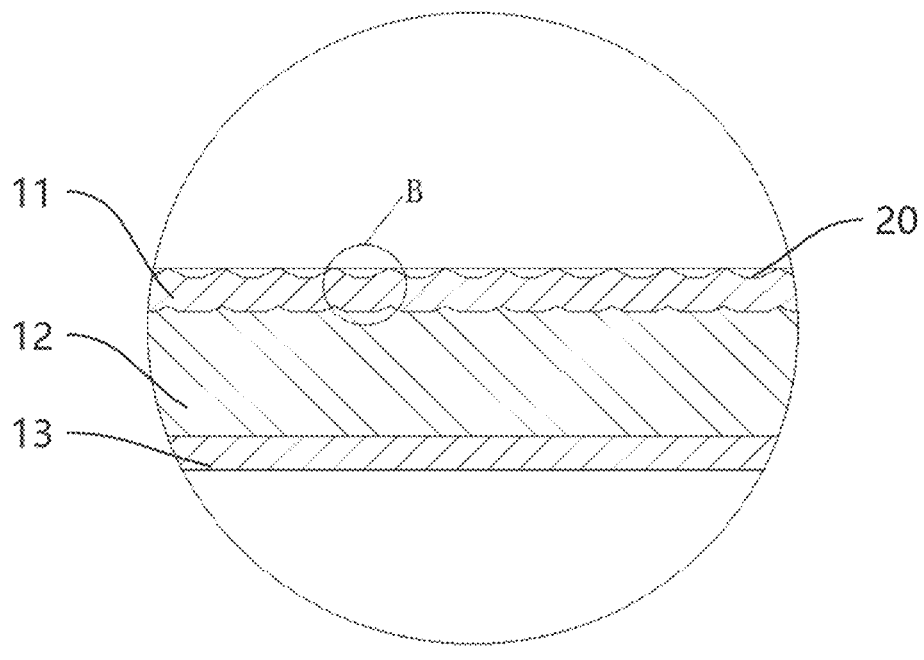
FIG. 2 is an enlarged view of part A in FIG. 1 (interface of concave-convex units) according to the present disclosure.
Figure 3:
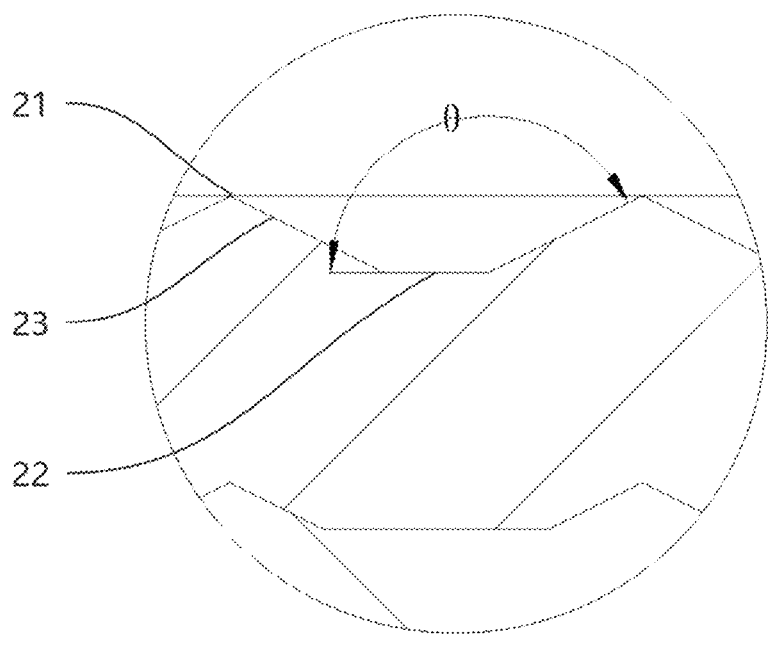
FIG. 3 is an enlarged view of part B in FIG. 2 (schematic view of the included angle between the concave bottom surface and the concave side surface) according to the present disclosure.

One embodiment of the present disclosure discloses an uncoated non-stick pan. Referring to FIGS. 1, 2 and 3, the uncoated non-stick pan includes a pan body 10 with a non-stick area 16 formed on the inner surface of the pan body 10. The non-stick area 16 includes multiple of interconnected concave-convex units 20, each of which includes multiple of first convex ribs 21 and a concave part enclosed by multiple of the first convex ribs 21. The concave part includes a concave bottom surface 22 and a concave side surface 23, the concave bottom surface 22 is connected to the first convex ribs 21 through the concave side surface 23, and the included angle between the concave side surface 23 and the concave bottom surface 22 is greater than 90°.

Figure 4:
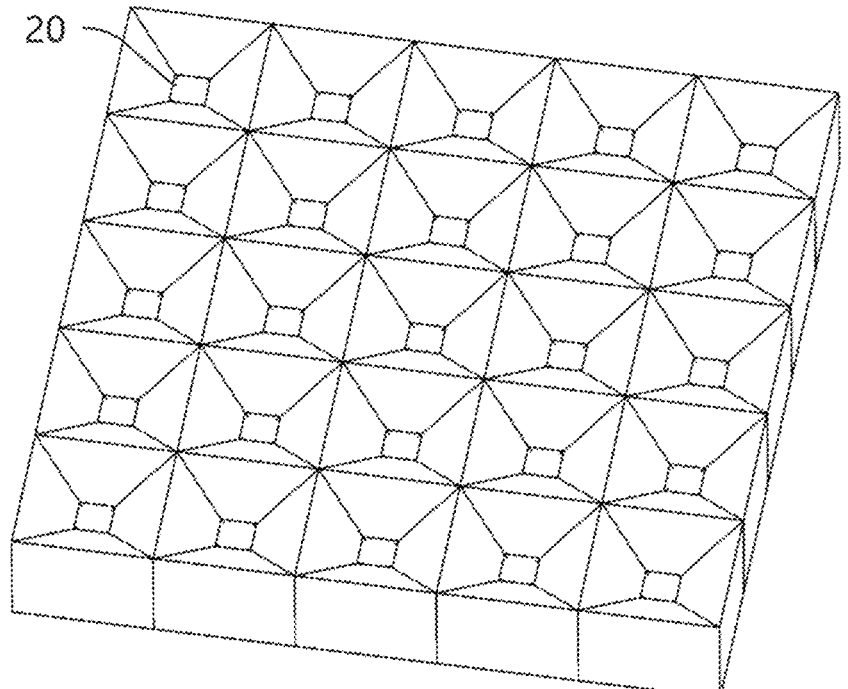
FIG. 4 is a structural view of a plurality of interconnected concave-convex units (in the unstretched state of the plate) according to the present disclosure.
Figure 5:
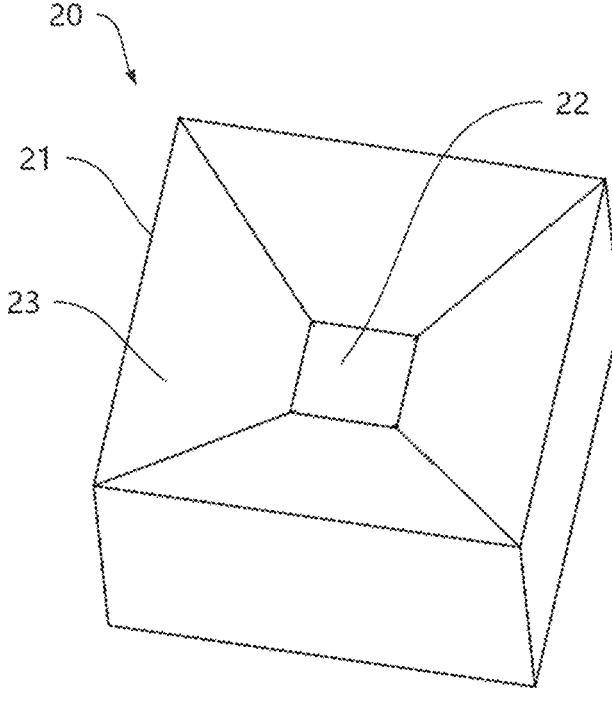
FIG. 5 is a structural view of one concave-convex unit according to the present disclosure.

FIG. 5 is a structural view of one concave-convex unit 20, and FIG. 4 is a structural view of multiple of the concave-convex units 20 interconnected with each other.

In actual use, the concave-convex units 20 on the inner surface of the pan body 10 provide a non-stick effect. The concave-convex units 20 themselves realize the non-stick effect by reducing the contact area between the inner surface of the pan body 10 and food, thereby preventing food from sticking to the inner surface of the pan body 10. By providing the concave part, when cooking food with the uncoated non-stick pan, the mixture of oil and water will preferentially enter the concave part. Upon heating the pan body 10, the high-temperature steam generated by the oil-water mixture forms a vapor layer beneath the food and preventing the food from sticking to the inner surface of the pan body 10.

In the embodiment of the present application, since both the length and width of the first convex ribs 21 are relatively small, small-sized food may be prevented from entering the concave part and clogging it. In addition, the first convex ribs 21 are connected to the concave bottom surface 22 through the concave side surface 23. The included angle between the concave side surface 23 and the concave bottom surface 22 is greater than 90°, and the concave side surface 23 is an inclined surface, which helps to reduce the width of the first convex ribs 21. A plurality of concave-convex units 20 are interconnected, in other words, adjacent concave-convex units share the first convex ribs 21, further reducing the width of the first convex ribs. Specifically, referring to FIG. 4, the concave side surfaces 23 of two adjacent concave-convex units 20 are connected by the same first convex rib 21. Theoretically, the first convex rib 21 may have a sharp-tipped structure. Compared with the uncoated non-stick pan with oil-storage microhole structure in the related art, in the uncoated non-stick pan provided by the embodiment of the present application, the size of the concave-convex units 20 is smaller, which may reduce the possibility of food entering the concave-convex units 20, and also facilitate the cleaning of the non-stick pan after cooking, avoiding food residues remaining in the concave parts of the concave-convex units 20.

As an optional embodiment, the length of the aperture of the concave part's side may range from 0.2 mm to 1 mm. Furthermore, the aperture dimension of the concave part falls within the range of 0.2 mm to 0.8 mm.

In the present embodiment, the aperture dimension of the concave part is specified. The maximum part of the aperture dimension at the top of the concave part enclosed by a plurality of first convex ribs 21 does not exceed 0.8 mm. For example, when the aperture shape of the concave part is circular, the diameter of the concave part is not greater than 0.8 mm; when the aperture shape of the concave part is rectangular, the maximum diagonal length of the concave part is not greater than 0.8 mm. The aperture dimension of the concave part specified in this embodiment is smaller than that of the oil storage microhole structure in the related art (For example, in the related art, the dimension of the oil-storage microhole is generally ranges from 2 mm to 3 mm). When cooking food with the uncoated non-stick pan provided by the embodiment of the present application, even small-sized food ingredients are unable to enter the concave part through the top aperture of the concave part, thus preventing food from clogging the concave part. The aperture dimension of the concave part is not less than 0.2 mm, which may avoid the problems of difficult processing or high processing cost caused by excessively small concave-convex units.

The embodiment of the present application primarily sets a limit on the maximum dimension of the aperture of the concave part, while not imposing specific restrictions on the minimum dimension of the concave part, provided it is minimized as much as feasible within the allowable range of the processing technology.

It should be noted that, compared with the oil-storage microholes featuring vertical side walls, in the present embodiment, through the provision of inclined concave side surfaces, when the bottom width of the first convex ribs 21 between two adjacent concave parts can be reduced under the condition of the same width at the bottom of the concave part, thereby reducing the contact area between the pan body 10 and food materials during cooking and improving the non-stick effect while ensuring the strength of the pan body 10.

In the present embodiment, the specific shape of the concave-convex unit 20 is not specifically limited. In specific design, the aperture shape of the concave-convex part may be one selected from circular, rectangular, or regular hexagon, as long as the above-mentioned dimension of the concave-convex unit 20 and the inclined structure of the concave side surface 23 are satisfied.

As an embodiment of the present disclosure, the included angle between the concave side surface 23 and the concave bottom surface 22 ranges from 120° to 180°. As shown by angle θ in FIG. 3, the bottom area of the concave part of each concave-convex unit 20 in the present embodiment is small, and the area of the opening of the concave part is larger than the bottom area. In this way, within the limited range of the inner surface of the pan body 10, the area occupied by the top of the concave-convex unit 20 is minimized while ensuring the oil storage capacity of the concave-convex unit 20.

In the present embodiment, the inclination angle of the concave inclined surface relative to the concave bottom surface 22 is specified. It is evident that the width of the first convex rib 21 at the top of the concave part is significantly smaller than the that at the bottom of the concave part. Consequently, the larger width at the base of the concave part may ensure the overall strength of the concave-convex unit 20. The top of the concave-convex unit (i.e., the first convex rib 21) is approximately a sharp-tipped structure, which reduces the contact area with food and enhances the non-stick performance.

As an optional embodiment, in the case that the included angle between the concave side surface 23 and the concave bottom surface 22 is 120°, the included angle between the concave side surface 23 and the protruding direction of the concave-convex unit 20 is 30°. In this case, the concave side surface 23 is relatively steep, and the opening area at the top of the concave part is slightly larger than that of the concave bottom surface 22. Moreover, since the overall size of the concave-convex unit 20 disclosed in the present disclosure is smaller than that of the concave-convex structure on the inner surface of the pan body of the non-stick pan in the related art, even if the opening at the top of the concave part is slightly larger than the bottom area of the concave part, the concave part is not easy to retain food.

By designing the concave side surface 23 of the concave part as an inclined structure, the technical solutions disclosed in the present disclosure may avoid food clogging the concave part during cooking, and the inclined structure also facilitates the discharge of substances (such as food residues) in the concave part when cleaning the pan body. As mentioned above, the arrangement of the inclined structure of the concave inclined surface may also reduce the width of the first convex rib 21 at the top of the concave part. Under the condition that the overall area of the concave part is constant, the larger the included angle between the concave side surface 23 and the concave bottom surface 22, the smaller the width of the first convex rib 21 at the top of the concave-convex unit 20, which may reduce the area ratio of the first convex rib 21 in the entire concave-convex unit 20. When manufacturing the non-stick pan, the total area of the non-stick area 16 of the non-stick pan is fixed. Under the condition that the area of the concave-convex unit 20 is determined, the first convex rib 21 may reduce the contact area with food materials during cooking and enhance the non-stick performance.

As one embodiment of the present disclosure, the combined area of all the first convex ribs 21 within the non-stick area 16 accounts for 5% to 10% of the total area of the non-stick area 16. The present embodiment discloses the range of the area ratio of the first convex ribs 21 in the non-stick area, which further reduces the contact area with food and improves the non-stick performance. It should be noted that in the present disclosure, the area ratio of the first convex ribs 21 is decreased by reducing the width of the first convex ribs 21. Due to the arrangement of the inclined concave side surfaces 23, reducing the width of the first convex ribs 21 does not lead to an increase in the bottom area of the concave part. During cooking, food is less likely to reach the bottom of the concave part, and the possibility of food remaining in the concave part is avoided while reducing the contact area with food.

In the related art where the concave side surface is a vertical side surface, the width of the first convex rib may be reduced by increasing the bottom area of the concave part, but the non-stick performance of the related art is lower than that of the embodiment of the present application.

In one embodiment of the present disclosure, the width of the first convex rib 21 ranges from 0.1 mm to 0.3 mm, and the height difference between the first convex rib 21 and the concave bottom surface 22 ranges from 0.05 mm to 0.3 mm. Furthermore, the height difference between the first convex rib 21 and the concave bottom surface 22 ranges from 0.05 mm to 0.1 mm. Of course, the height difference between the first convex rib 21 and the concave bottom surface 22 may also range from 0.1 mm to 0.3 mm.

In actual practice, the side length of the concave bottom surface 22 may be obtained according to the length of the first convex rib and the inclination angle of the concave side surface. Since the included angle between the concave side surface 23 and the concave bottom surface 22 is greater than 90°, the side length of the concave bottom surface 22 will not exceed the length (ranging from 0.2 mm to 0.8 mm) of the first convex rib 21 at the corresponding opening part of the concave part.

The width of the first convex rib 21 in the present embodiment ranges from 0.05 mm to 0.3 mm, which will make the first convex rib 21 form a sharp-tipped effect, thereby reducing the contact area with food and increasing the non-stick performance. The size of the concave-convex unit 20 in the present disclosure is smaller than that of the concave-convex structure on the inner surface of the pan body in the related art, and the concave-convex unit 20 with a smaller size may achieve a better non-stick performance.

Similarly, given the difficulty in processing the concave-convex units 20 in the pan body 10 mentioned above, in order to improve processing efficiency as well as reduce production costs, the titanium metal layer 11 in one embodiment of the present disclosure further includes a first area 14 located at the edge of the pan body 10, and an annular transition area 15 is located between the first area 14 and the non-stick area 16. As an optional embodiment, the transition area 15 is an annular groove.

During actual use of the pan body 10, the cooking area is generally only the central area of the pan body 10, and the edge area (i.e., the first area 14) generally does not directly contact food. Therefore, it is not necessary to provide the concave-convex units 20 mentioned above in the edge area of the pan body 10, which may reduce the area of the non-stick area 16 on the inner surface of the pan body 10 and cut down on the processing cost.

Since the non-stick area 16 is frequently contacted by the spatula during the cooking process, in order to reduce the wear of the surface of the non-stick area 16, the surface of the non-stick area 16 in one embodiment of the present disclosure is subjected to nitriding treatment to form a nitrided layer, which increases the hardness of the non-stick area 16, improves wear resistance, and ensures the non-stickiness of the non-stick pan for a longer period of time. Since the color of the surface of the non-stick area 16 changes after nitriding treatment, in order to avoid color difference between the first area 14 and the non-stick area 16, optionally, the surface of the first area 14 is subjected to oxidation treatment to form an oxidized layer. Therefore, the oxidation treatment of the first area 14 may not only make the color of the inner surface of the pan body 10 consistent, but also improve the hardness of the first area 14 and reduce scratches and damage to the non-stick pan caused by hard cooking tools.

In the present disclosure, two adjacent concave-convex units 20 are connected through one of the first convex ribs 21. The top surfaces of the concave-convex units 20 are only connected via the first convex ribs 21. The first convex ribs 21 disclosed in the present disclosure are approximately linear structures, and in actual design, the first convex ribs 21 may be formed into sharp tips to minimize the contact area with food.

In one embodiment of the present disclosure, several convex ribs enclose the concave part with a rectangular cross-section. The concave bottom surface 22 is located at the center of the bottom of the concave part, and the sides of the concave bottom surface 22 are arranged in one-to-one correspondence with the convex ribs. Referring to FIGS. 4 and 5, the opening of the concave part disclosed in the present disclosure is rectangular. The top of the concave-convex unit 20 includes four first convex ribs 21 forming a rectangle. The concave bottom surface 22 is also rectangular. The concave bottom surface 22 is also rectangular and corresponds one-to-one with the four convex ribs. And each side of the concave bottom surface 22 is connected to its corresponding first convex rib 21 via the inclined concave side surface 23.

Referring to FIG. 2, in one embodiment of the utility mode, the base material of the pan body 1 is a multi-layer composite structure. The multi-layer composite structure includes a titanium metal layer 11 and an aluminum metal layer 12. The titanium metal layer 11 forms the inner surface of the pan body and the non-stick area.

As another optional embodiment, the base material of the pan body 10 is a multi-layer composite structure including a titanium metal layer 11, an aluminum metal layer 12 and a steel metal layer 13, with the aluminum metal layer 12 located between the titanium metal layer 11 and the steel metal layer 13. Similarly, the titanium metal layer 11 forms the inner surface of the pan body and the non-stick area.

When preparing the uncoated non-stick pan disclosed in the present disclosure, the following preparation method may be employed, as detailed below:

Embossing the surface of the titanium metal layer 11 of the plate to form several interconnected concave-convex units 20 on the surface of the titanium metal layer 11, wherein each concave-convex unit 20 includes a plurality of first convex ribs 21 and a concave part enclosed by the plurality of first convex ribs 21, the concave part includes a concave bottom surface 22 and a concave side surface 23, the width of the first convex rib 21 is not greater than 0.5 mm, the length of the first convex rib 21 is not greater than 0.8 mm, the concave bottom surface 22 is connected to the first convex rib 21 through the concave side surface 23, and the included angle between the concave side surface 23 and the concave bottom surface 22 is greater than 90°;

Oxidizing the inner surface of the titanium metal layer 11 of the plate;

Stretching the plate to form the cookware, wherein the side of the titanium metal layer 11 with the concave-convex units 20 forms the inner surface of the pan body;

Performing laser nitriding treatment on the area of the concave-convex units 20 of the titanium metal layer 11 to form a nitrided layer.

It should be noted that the steps of laser nitriding and plate stretching in the preparation method of the uncoated non-stick pan in the present disclosure may be interchanged. That is, the inner surface of the formed cookware may be subjected to laser nitriding treatment after stretching the plate to form the pan body. Or alternatively, the embossed area of the plate may be subjected to laser nitriding treatment first, and then the plate may be stretched to form the inner surface of the pan body with the embossed area.

It can be seen that in the present disclosure, the concave-convex units 20 are formed on the titanium metal surface to minimize the contact between the concave-convex units 20 and food, and laser nitriding is adopted in the area of the concave-convex units 20 to improve the hardness of the area that is in contact with food and the steel spatula for a long time and improve wear resistance. The uncoated non-stick pan prepared by the technical solution has the advantages of the uncoated non-stick pan mentioned above.

The above described are only specific implementations of the present disclosure, which do not constitute a limitation on the protection scope of the present disclosure. Those skilled in the art should understand that the present disclosure includes but is not limited to the content described in the above accompanying drawings and the above specific implementations. Any modification without departing from the functional and structural principles of the present disclosure falls within the scope of the claims.

What is claimed is:

1. An uncoated non-stick pan, comprising a pan body with a non-stick area formed on an inner surface of the pan body, wherein the non-stick area comprises a plurality of concave-convex units interconnected to each other, each of the plurality of concave-convex units comprises a plurality of first convex ribs and a concave part enclosed by the plurality of first convex ribs, the concave part comprises a concave bottom surface and a concave side surface, the concave bottom surface is opposite to the plurality of first convex ribs and connected to the plurality of first convex ribs through the concave side surface, and an included angle between the concave side surface and the concave bottom surface is greater than 90°.

2. The uncoated non-stick pan according to claim 1, wherein the concave bottom surface is rectangular in shape, and the plurality of first convex ribs are provided in one-to-one correspondence with sides of the concave bottom surface.

3. The uncoated non-stick pan according to claim 1, wherein an aperture dimension of the concave part ranges from 0.2 mm to 0.8 mm.

4. The uncoated non-stick pan according to claim 1, wherein the included angle between the concave side surface and the concave bottom surface ranges from 120° to 180°.

5. The uncoated non-stick pan according to claim 1, wherein a combined area of the plurality of first convex ribs within the non-stick area accounts for 5% to 10% of a total area of the non-stick area.

6. The uncoated non-stick pan according to claim 1, wherein a width of each of the plurality of first convex ribs ranges from 0.1 mm to 0.3 mm.

7. The uncoated non-stick pan according to claim 1, wherein a height difference between each of the plurality of first convex ribs and the concave bottom surface ranges from 0.1 mm to 0.3 mm.

8. The uncoated non-stick pan according to claim 1, wherein the inner surface of the pan body further comprises a first area located at an edge of the pan body, and an annular transition area positioned between the first area and the non-stick area.

9. The uncoated non-stick pan according to claim 8, wherein a surface of the non-stick area is subjected to nitriding treatment to form a nitrided layer, and a surface of the first area is subjected to oxidation treatment to form an oxidized layer.

10. The uncoated non-stick pan according to claim 1, wherein two adjacent concave-convex units of the plurality of concave-convex units are interconnected through one first convex rib of the plurality of first convex ribs.

11. The uncoated non-stick pan according to claim 1, wherein the plurality of concave-convex units are formed by embossing.

12. The uncoated non-stick pan according to claim 1, wherein a base material of the pan body comprises a titanium metal layer and an aluminum metal layer, wherein the titanium metal layer forms the inner surface of the pan body and the non-stick area, or the base material of the pan body comprises a titanium metal layer, an aluminum metal layer and a steel metal layer, wherein the aluminum metal layer is interposed between the titanium metal layer and the steel metal layer, and the titanium metal layer forms the inner surface of the pan body and the non-stick area.

\* \* \* \* \*